United States Patent [19]

Davis

[11] Patent Number: 5,219,051
[45] Date of Patent: Jun. 15, 1993

[54] FOLDED VISCOUS DAMPER

[75] Inventor: Lawrence P. Davis, Phoenix, Ariz.

[73] Assignee: Honeywell Inc., Minneapolis, Minn.

[21] Appl. No.: 783,748

[22] Filed: Oct. 25, 1991

[51] Int. Cl.⁵ .............................................. F16F 9/10
[52] U.S. Cl. ................................... 188/378; 188/276; 188/298; 188/314; 188/322.5; 267/136; 267/122; 267/140.5; 267/221
[58] Field of Search ............... 188/378, 379, 380, 298, 188/311, 313, 314, 322.5, 266, 276, 277, 278; 267/136, 122, 221, 226, 34, 35, 118, 123, 124, 140.11, 140.5, 117; 248/631

[56] References Cited

U.S. PATENT DOCUMENTS

| | | | |
|---|---|---|---|
| 2,597,800 | 5/1952 | Hussman | 188/322.5 |
| 2,776,829 | 1/1957 | Cockram | 267/122 X |
| 2,916,307 | 12/1959 | Peters | 188/322.5 X |
| 2,919,883 | 1/1960 | Murphy | 267/122 X |
| 2,930,455 | 3/1960 | Williams | 188/322.5 X |
| 3,101,937 | 8/1963 | Stearns | 267/122 |
| 3,107,752 | 10/1963 | McLean | 188/322.5 X |
| 3,141,523 | 7/1964 | Dickie | 188/322.5 |
| 3,167,157 | 1/1965 | Thorn | 267/122 X |
| 3,445,080 | 5/1969 | Flannelly | 188/378 X |
| 3,695,665 | 10/1972 | Matsuura | 267/122 X |
| 3,722,875 | 3/1973 | Hasse | 267/122 |
| 3,989,232 | 11/1976 | Steinbach et al. | 267/122 X |
| 4,436,188 | 3/1984 | Jones | 188/378 |
| 4,471,538 | 9/1984 | Pomeranz et al. | 188/322.5 X |
| 4,572,488 | 2/1986 | Holmberg, Jr. et al. | 267/122 X |
| 4,760,996 | 8/1988 | Davis | 267/122 |
| 4,848,525 | 7/1989 | Jacot et al. | 188/378 |
| 4,873,888 | 10/1989 | Matsuyama | 188/378 |
| 4,974,820 | 12/1990 | Nakanishi | 188/298 X |

FOREIGN PATENT DOCUMENTS

| | | | |
|---|---|---|---|
| 0050827 | 3/1986 | Japan | 188/298 |
| 2172081 | 9/1986 | United Kingdom | 188/298 |

Primary Examiner—Douglas C. Butler
Attorney, Agent, or Firm—Arnold L. Albin; Dale E. Jepsen; Al Medved

[57] ABSTRACT

A viscous damper for absorbing vibrations of low amplitude over a wide frequency range. Two working volumes of resiliently deformable material, in the form of a bellows, are provided in a folded structure joined by a base carrying a restrictive annular fluid passage. Compressive forces applied to the primary volume are transmitted by a damping fluid through the restrictive annulus to the secondary volume, the resulting energy dissipation providing a damping effect. A hermetically sealed configuration provides multi-axis damping and isolation without wearing of frictional surfaces. Large damping values are attained with linear performance over a large dynamic range. While the deformable members bear an inverse volumetric relationship as fluid is moved from one of the members through the fluid passage to the other member, the total volume of the members is substantially unconstrained, therefore permitting independent deformation with expansion or contraction of the damping fluid with respect to variations in temperature.

6 Claims, 3 Drawing Sheets

FOLDED VISCOUS DAMPER

BACKGROUND OF THE INVENTION

1. Field of The Invention

The present invention relates to an apparatus for vibration damping, and more particularly to a viscous damper having a compact folded structure for space satellite applications.

2. Description of The Prior Art

Spacecraft applications have shown an increasing need for vibration isolation. Such applications include the reduction of emitted vibrations from dynamically operating hardware such as rotating machinery, and to protect sensitive hardware from launch vibration and spacecraft disturbances. A structure which provided broad band isolation at very low disturbance levels was described in the L. P. Davis U.S. Pat. No. 4,760,996, assigned to the assignee of the present invention, which employed metal springs acting in parallel with a viscous fluid damping element. Stiffness was provided by coil springs operating in parallel with a metal bellows. Damping is provided by viscous flow of a damping fluid through an annular damping chamber during payload motion. However, this structure required a substantial length as it required a stacked array of bellows topped by a thermal compensator to correct for expansion and contraction of the damping fluid with temperature changes. A further drawback of the prior art structure was that it required a longitudinal rod packaged within the bellows to maintain a constant total volume, so that as one bellows was caused to expand, the other bellows was caused to contract. This required that sufficient height be provided for longitudinally aligning the first and second bellows and the thermal compensator. Since the total volume was maintained constant, it was necessary to provide the auxiliary thermal compensator to allow for expansion of the damping fluid with temperature.

Advantageously, it has been discovered that a structure which allows the primary and secondary bellows to expand or contract substantially independently with temperature changes in the damping fluid will allow a more compact design to be obtained by "folding" the structure and obviates the need for the volumetric confining shaft and thermal compensator. The present invention provides flexibility in design so that it can be used to provide a multi-axis damper or isolation system in a small size, hermetically sealed package without being subject to Coulomb forces and wearing of frictional surfaces. It provides linear performance and large damping values over a large dynamic range, including small vibration perturbations. The simplified mechanical design permits lower cost fabrication as compared to the prior art structures.

SUMMARY OF THE INVENTION

A viscous damper in accordance with the present invention comprises a base adapted for attachment to a structural member subject to vibration in which the base is provided with first and second apertures and an annular fluid passage communicating between the first and second apertures. Disposed upon the base is a resiliently deformable damping member adapted for supporting a payload and having a fluid chamber of variable volume communicating with the first aperture to the fluid passage. A second resiliently deformable damping member has a first end attached to the base and is provided with a fluid chamber of variable volume which communicates through the second aperture to the fluid passage. The fluid passage and the fluid chambers are filled with a viscous damping fluid. As fluid is moved from one of the resiliently deformable damping members through the fluid passage to the other deformable damping member, they are deformed in a substantially inverse volumetric relationship, the total volume of the two members being unconstrained, and both members being free for independent deformation on expansion or contraction of the viscous fluid in accordance with variations in temperature of the fluid.

In a preferred embodiment, the first and second resiliently deformable damping members are disposed along first and second longitudinal axes, and wherein the members are spaced apart axially and aligned in parallel with each other but angularly disposed with respect to the base. Preferably, the deformable damping members will be comprised of a bellows having a predetermined spring constant, at least one of said bellows which may be augmented by a coaxial spring for providing additional spring bias.

Further embodiments provide for additional bellows elements and corresponding apertures and fluid passages to provide for damping along a plurality of longitudinal axes corresponding to the angularly disposed faces of the base.

DESCRIPTION OF THE PREFERRED EMBODIMENT

Figure 1:
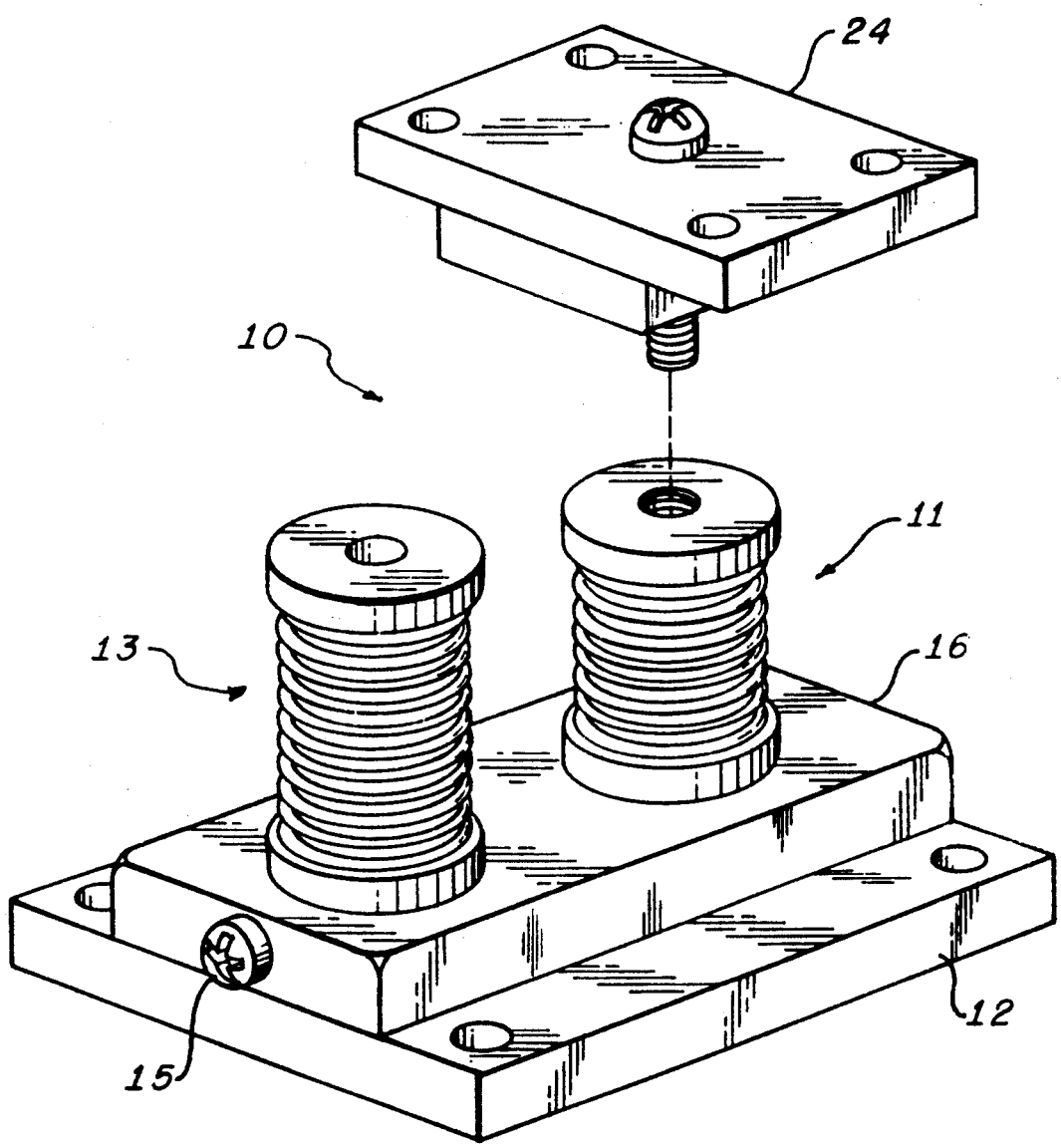
FIG. 1 is a perspective view of an embodiment of the present viscous damper invention.

The construction of a folded viscous damper will be described with reference to FIG. 1. Viscous damper 10 includes a base 16 for mounting to a structural member 12 which may comprise a vibration source. Mounted upon base 16 is a primary resiliently deformable damping member 11, which may be in the form of a bellows, and a secondary resiliently deformable damping member 13, also preferably formed of a bellows. Member 11 may be affixed to a payload adapter 24 which in turn is attached to a payload (not shown) which is to be isolated from vibration and shock. Thus, vibrations induced from the vibration source coupled to the base 16 are damped by viscous damper 10 and precluded from affecting the payload adversely. Structural member 12 and the payload adapter 24 form no part of the present invention and are shown for clarity of the description.

Figure 2:
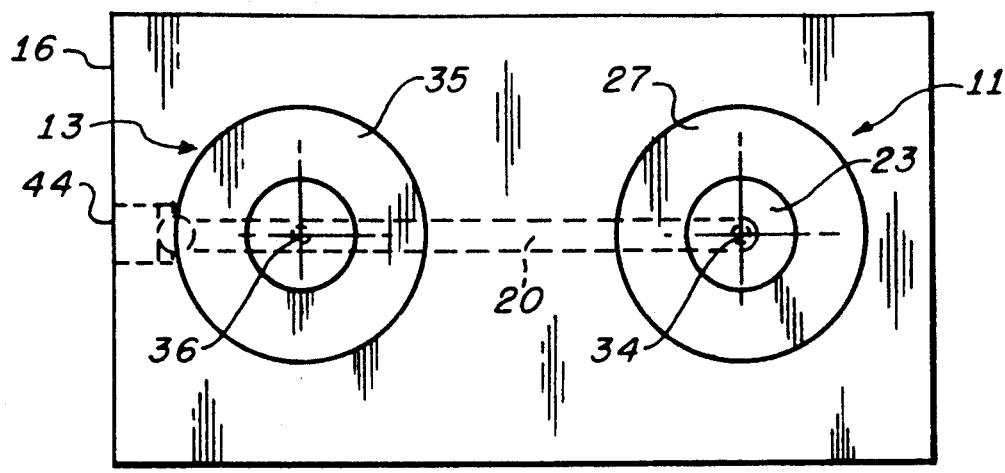
FIGS. 2 and 3 are cross-sectional views of the embodiment of the invention as shown in FIG. 1.
Figure 3:
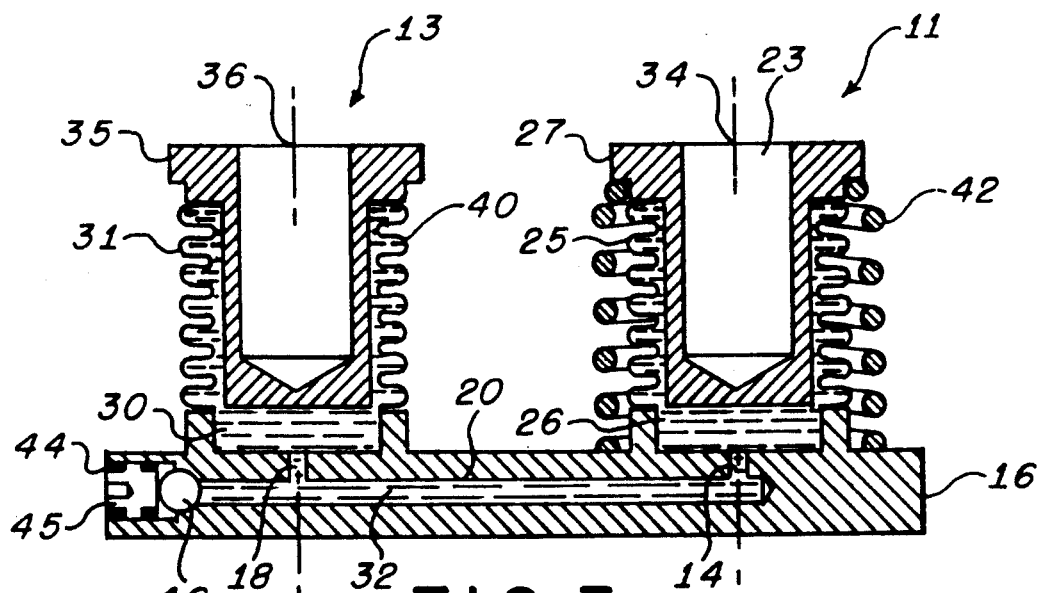

Referring now to FIGS. 2 and 3, there is shown in detail cross-sectional views of a preferred embodiment of the invention. The base 16 may be made of an appropriate rigid material such as plastic or metal suitable for fluid containment without deformation when the fluid is pressurized, and adapted for mounting to the structural supporting member. Circular damping members 11 and 13 are mounted axially spaced apart and disposed in parallel with each other and orthogonally disposed with respect to the base 16. The members may be clamped or otherwise fastened to the base 16 in a conventional manner. The upper face of the member 11 presents a central circular opening 23 which may be threaded or otherwise adapted for securing to the payload adapter 24. Member 11 is formed of a sleeve 25, which may be comprised of a bellows constructed of resiliently deformable material such as nickel, titanium, or beryllium copper alloy having a predetermined spring constant and a rigid cylindrical insert 27 which is so constructed and adapted as to seal and provide in combination with sleeve 25 a fluid chamber 26 which communicates with an aperture 14 in the base 16. Thus, fluid chamber 26 will provide a variable volume in accordance with the amplitude of vibrations transmitted from the base to the payload adapter, which results in expansion or compression of the sleeve 25. As fluid 32 is moved from damping member 11 through aperture 14 it is constrained by annular fluid passage 20 and flows through aperture 18 into fluid chamber 30 of damping member 13, which is constructed in a manner similar to member 11. Thus it may be seen that the resiliently deformable members 11 and 13 bear an inverse volumetric relationship with deformation of one of the members as fluid is moved from the one member through the fluid passage to the other member, the total volume of the damping members being substantially unconstrained, and the damping members being free for independent deformation on expansion or contraction of the viscous fluid with respect to variations in temperature thereof.

Fluid passage 20 and fluid chambers 26 and 30 are provided with the viscous damping fluid 32 through a fill hole 44 which extends to an end of base 16 and communicates with the fluid passage 20. The sleeve 25 of resiliently deformable member 11 and a sleeve 31 of member 13 may be formed to provide a desired spring constant as described above. Alternatively, an auxiliary spring 42, coaxially mounted with sleeve 25, may be provided to augment the spring constant or to preload deformable damping member 11. Likewise, deformable damping member 13 may be adapted to augment the spring constant in a similar manner.

As shown in FIG. 3, the members 11 and 13 are adapted in particular to be elongation stressed along longitudinal axes 34 and 36, respectively. The upper end of member 11, comprising the top of insert 27, may also be angularly displaced with respect to longitudinal axis 34 during vibration, typically over an angle as much as 5 degrees, and the resiliency of sleeve 25 acting through the viscous fluid will provide corresponding angular damping.

The fluid for filling passage 20 and chambers 26 and 30 is a fluid whose sensitivity to temperature is low and which is chemically neutral with respect to the materials forming the fluid chambers. Silicone fluid exhibits very satisfactory properties. In order to permit injection of the viscous damping fluid through the fill hole 44 and retain viscous fluid within the fluid passage 20 a plug or other type of seal is required. In FIG. 1 the seal is provided by a threaded screw 15 and a gasket (not shown). In FIG. 3 an alternate construction of the seal is shown by a metallic sphere 46 which is forced against the fluid passage by a press-fitted or threaded seal 45.

Figure 4:
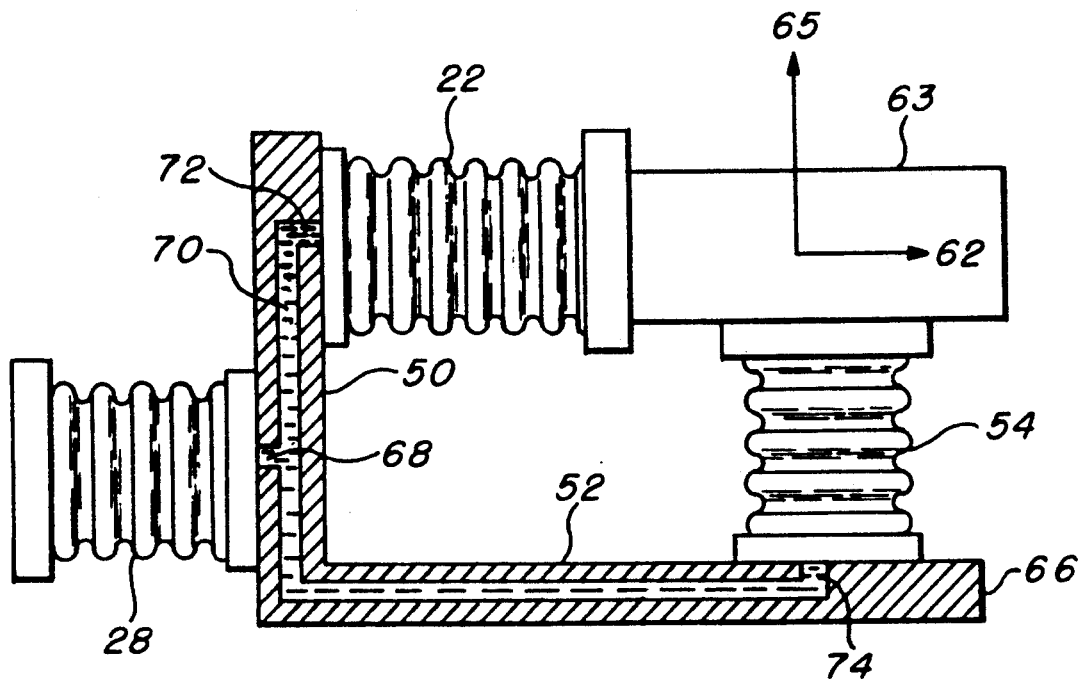
FIG. 4 is a cross-sectional view of a further embodiment of the invention providing isolation along two longitudinal axes and having a common fluid passage between bellows elements.

FIG. 4 shows a further preferred embodiment of the invention which provides multi-axial vibration damping. Base 66 has first and second angularly disposed faces 50 and 52. Face 50 is adapted for receiving a first resiliently deformable damping member 22 along a longitudinal axis 62 and is adapted to be attached at its distal end to a payload adapter 63. A second resiliently deformable damping member 54 constructed as in accordance with member 22 is attached to face 52 of base 66 and adapted to be attached along a longitudinal axis 65 to payload adapter 63. A third damping member 28 is mounted on base 50 opposing face 28 and damping member 22. Members 22 and 54 may be denoted as primary damping members, and member 28 as a secondary damping member. Secondary member 28 is provided with a fluid chamber which communicates through aperture 68 to annular fluid passage 70 which, in turn, communicates through aperture 72 to damping member 22 and through aperture 74 to damping member 54. Thus, it may be seen that the viscous damper is operative when the vibration source has a displacement component along at least one of two axially opposing directions corresponding to longitudinal axes 62 and 65, and secondary member 28 is resiliently responsive to the transfer of fluid between member 28 and at least one of members 22 or 54. In a similar manner, provision may be made for damping in a third direction orthogonal to the plane of axes 62 and 65 by providing an additional resiliently deformable member and fluid passage coupled to fluid passage 70.

Figure 5:
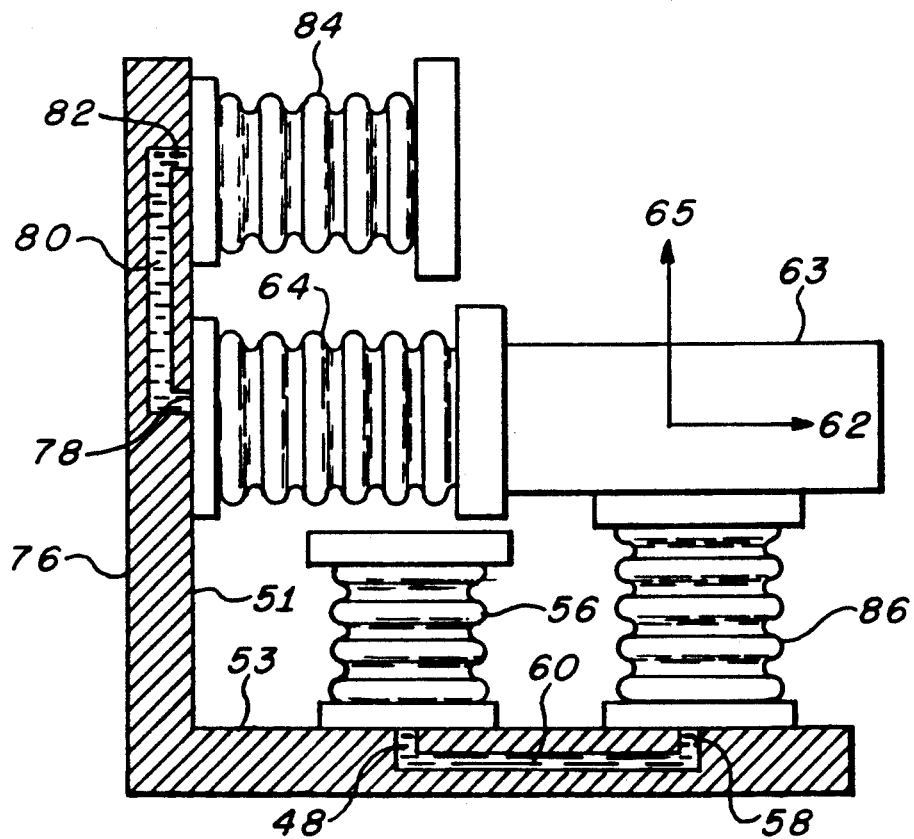
FIG. 5 is a cross-sectional view of a multi-axis viscous damper wherein the bellows elements employ isolated fluid passages.

A still further preferred embodiment is shown in FIG. 5. Base 76 is provided with two independent annular fluid chambers 60 and 67. Base 76 has two angularly disposed faces 51 and 53 for mounting damping members 64 and 66 so as to provide vibration damping along longitudinal axes 62 and 65 to a payload through adapter 63. Thus, damping member 64, which may be affixed to one surface of payload adapter 63, has a fluid chamber which communicates through an aperture 78 to an annular fluid passage 80 and exits at aperture 82 to a secondary damping member 84. Members 64 and 84 thus form a viscous damper as in FIG. 2. In a similar manner a damping member 66 is affixed to an opposing surface of payload adapter 63 and cooperates with a secondary damping member 86 through fluid apertures 48 and 58 and fluid passage 60. It may be seen then that the damper is operative when the vibration source has a displacement component along at least one of longitudinal axes 62, 65, damping members 64 and 84 being resiliently responsive to displacement of the payload adapter 63 along longitudinal axis 62 and members 56 and 86 being resiliently responsive to displacement of the payload adapter along the longitudinal axis 65. The vibration source (not shown) is coupled to base 76 in a manner as heretofore described so that vibration induced thereby may be damped accordingly.

Referring again to FIG. 3, in operation payload isolation is provided by the compliance of resilient member 11 and as augmented by optional spring 42 and the energy absorbing force proportional to velocity caused by fluid shear through the annular fluid passage 20. This shear results when fluid is forced from the volume enclosed within the primary bellows 25 to the secondary volume contained by the secondary bellows 31 and conversely from bellows 31 to bellows 25. This, in turn, is caused by relative motion between the payload and the mounting interface. Thus, application of compressive force to base 16 causes insert 27 to be pushed into sleeve 25, which is deformable longitudinally and angularly with respect to its longitudinal axis. Since the volume of fluid chamber 26 is reduced, damping fluid 32 is forced through aperture 14 into fluid passage 20. The rate of flow of fluid 32 through the passage 20 is regulated by the dimensions of the channel and the orifices in the base. The term "fluid passage" as used herein may refer to a circular, elliptical or other geometric shape. The fluid passage 20 may be sized to permit a greater or reduced rate of flow of damping lfuid therethrough. The compressed fluid is then forced through aperture 18 into fluid chamber 30 of member 13, thereby forcing the expansion of the fluid chamber 30 and a corresponding expansion of sleeve 31 and deflection of insert 35. When member 11 is relieved of compressive force, the insert 27 is caused to rise by the expansion of sleeve 25 induced by the spring constant thereof and of spring 42, and of the flow of damping fluid from chamber 30 to chamber 26.

Figure 6:
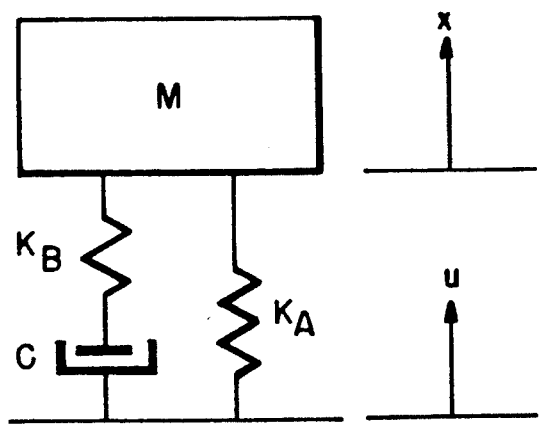
FIG. 6 is a schematic equivalent circuit of the damper useful in understanding the operation of the invention.

A mathematical model illustrating the dynamics of motion is helpful in further understanding the operation of the invention. FIG. 6 is a schematic diagram showing the equivalent mechanical circuit of the spring-mass arrangement, which corresponds to the prior art in-line configuration, and therefore offers the same degree of predictability, in that the constituent elements are physically independent and individually deterministic, thereby permitting a precise design for the desired dynamic characteristics. Reference character M represents the mass of the payload. Character $K_A$ represents the combined axial stiffness of the bellows and the parallel spring (if used). Character $K_B$ represents the compressibility of the fluid and the volume change of the bellows due to the pressure of the fluid; that is, the stiffness that would result if the annulus was plugged, preventing any fluid flow when a load was applied. The factor C is the damping coefficient of the fluid passage. The displacement of the vibration source is represented by u while x is the resulting displacement of the payload M. A typical range of values in the units of measure are shown in Table I:

TABLE I

| PARAMETER | UNITS | RANGE |
|---|---|---|
| M | lbs-sec$^2$/ft | 0.1–50 |
| x | in | $10^{-6}$–1.0 |
| u | in | $10^{-6}$–5.0 |
| $K^A$ | lb/in | 5–500 |
| $K^B$ | lb/in | 500–500,000 |
| C | lb-sec/in | 1–10,000 |

It may be seen then that the primary bellows need not be located in alignment or in any particular orientation relative to the secondary bellows. This permits great flexibility in the package shape of the damper. The two volumes put in parallel as shown in the figures allows a package of reduced height. Further, several primary or secondary bellows can be used in conjunction to provide multi-axis isolation. Because a flexible bellow is used, without a longitudinal constraining rod, angular motion is readily accommodated. A third axis can be similarly added. Note further that a temperature compensator bellows is not required as is the case where the working volumes are inversely proportional but rigidly constrained by an inner rod. A suitable choice of the bellows spring constant allows elimination of the auxiliary spring. The resultant device provides linear performance over a large dynamic range while yielding large damping values.

While the invention has been described in its preferred embodiments, it is to be understood that the words which have been used are words of description rather than limitation and that changes may be made within the preview of the amended claims without departing from the true scope and spirit of the invention in its broader aspects.

I claim:
1. A multi-axis viscous damper, comprising:
    a base adapted for attachment to a structural member, said base defining at least first, second, and third apertures and an annular fluid passage for providing fluid communications between said first, second and third apertures,
    a first resiliently deformable damping member disposed along a first longitudinal axis, said first damping member having a first end adapted for attachment to a first face of a payload to be isolated from vibration and a second end disposed upon said base, and providing a fluid chamber of variable volume communicating through said first aperture to said fluid passage,
    a second resiliently deformable damping member, said second damping member having first and second ends, said first end of said second damping member being attached to said base and providing a fluid chamber of variable volume communicating with said fluid passage through said second aperture, said second end of said second damping member being free to allow volumetric expansion of said second damping member,
    said base having first and second angularly disposed faces for receiving said first resiliently deformable damping member on said first face of said base and a third resiliently deformable damping member on said second face of said base, said third damping member having a fluid chamber communicating with said fluid passage through said third aperture,
    a first end of said third resiliently deformable damping member adapted for attachment to a second face of said payload along a further longitudinal axis angularly disposed with respect to said first face of said payload,
    so that said viscous damper is operative when said payload has a displacement component along at least one of said first and said further longitudinal axes, said third damping member being resiliently responsive to transfer of fluid between said third damping member and at least one of said first and second damping members,
    a viscous damping fluid filling said fluid passage and said fluid chambers of said first, second, and third resiliently deformable damping members,
    said first damping member and said third damping member being decoupled from said second end of said second damping member so as to allow said second damping member to be volumetrically deformable with expansion or contraction of said viscous fluid with respect to variations in temperature thereof while said first and third damping members are coupled by said payload, said first and third damping members being substantially coupled with respect to expansion or contraction of said members as a result of transfer of said viscous fluid therebetween, the total volume of said first and third damping members being substantially constrained by motions of said payload while said second damping member is decoupled from said payload to allow free expansion and contraction with variations in temperature of said fluid, said first, second and third damping members being in inverse volumetric relationship with respect to deformation of at least one of said damping members as fluid is moved from said at least one of said damping members through said fluid passage to another of said damping members and as fluid is returned through said fluid passage to said at least one damping member.

2. The viscous damper as set forth in claim 1, wherein said first and second resiliently deformable damping members are disposed respectively along said first longitudinal axis and a second longitudinal axis, said first and second damping members being axially spaced apart and aligned in parallel with each other and angularly disposed with respect to said base.

3. The viscous damper as set forth in claim 2, wherein said first and third damping members are disposed orthogonally with respect to said base.

4. The viscous damper as set forth in claim 3, wherein said first, second and third resiliently deformable damping members are each comprised of a bellows, each of said bellows having a predetermined spring constant.

5. The viscous damper as set forth in claim 4, further comprising spring bias means coaxially disposed with respect to at least one of said first, second and third members and axially constrained between first and second ends of said at least one member, for augmenting said predetermined spring constant of at least one of said bellows.

6. A multi-axis viscous damper, comprising:
a base adapted for attachment to a structural member, said base defining first and second apertures and an annular fluid passage for providing fluid communications between said first and second apertures, and further defining a second annular fluid passage communicating with third and fourth apertures,
a first resiliently deformable damping member disposed along a first longitudinal axis, said first damping member having a first end adapted for attachment to a first face of a payload to be isolated from vibration and a second end disposed upon said base, and providing a fluid chamber of variable volume communicating through said first aperture to said fluid passage,
a second resiliently deformable damping member, said second damping member having first and second ends, said first end of said second damping member being attached to said base and providing a fluid chamber of variable volume communicating with said fluid passage through said second aperture to said first aperture, said second end of said second damping member being free to allow volumetric expansion of said second damping member,
further comprising a third resiliently deformable damping member having a first end adapted for attachment to a second face of said payload, and having a fluid chamber communicating with said second fluid passage through said third aperture, and
a fourth resiliently deformable damping member having a first end attached to said base and having a fluid chamber communicating with said second fluid passage through said fourth aperture,
said base having first and second angularly disposed faces for receiving said first and second resiliently deformable damping members on said first face of said base and said third and fourth resiliently deformable damping members on said second face of said base,
said base being so constructed and adapted for receiving said first damping member along said first longitudinal axis and for receiving said second damping member along a second axis parallel thereto, and for receiving said third damping member along a further longitudinal axis and said fourth damping member along an axis parallel to said further longitudinal axis, said first and further longitudinal axes being angularly disposed with respect to one another, so that said viscous damper is operative when said base has a displacement component along at least one of said first and said further longitudinal axes, said first and second damping members being resiliently responsive to displacement of said base in a direction defined by said first longitudinal axis, and said third and fourth damping members being resiliently responsive to displacements of said base in a direction defined by said further longitudinal axis,
a viscous damping fluid filling said first and second fluid passages and said fluid chambers of said first, second, third and fourth resiliently deformable damping members,
said first end of said first damping member being decoupled from said second end of said second damping member so as to allow said second damping member to be volumetrically deformable with expansion or contraction of said viscous fluid with respect to variations in temperature thereof, and said first end of said third damping member being decoupled from said first end of said fourth damping member so as to allow said fourth damping member to be volumetrically deformable with expansion or contraction of said viscous fluid with respect to variations in temperature thereof, while said first ends of said first and third damping members are coupled by said payload, the volume of said first and third damping members being substantially constrained by motions of said payload while said second and said fourth damping members are decoupled from said payload to allow free expansion and contraction with variations in temperature of said fluid, said first and second and said third and fourth damping members respectively being in inverse volumtric relationship with respect to deformation of at least one of said damping members as fluid is moved from said at least one of said damping members through said fluid passage to another of said damping members and as fluid is returned through said fluid passage to said at least one damping member.

* * * * *